United States Patent [19]

Bliss

[11] Patent Number: 4,522,098

[45] Date of Patent: Jun. 11, 1985

[54] SAW GUIDE

[76] Inventor: Delbert N. Bliss, Rt. 4, Box 111, Winfield, Kans. 67156

[21] Appl. No.: 584,010

[22] Filed: Feb. 27, 1984

[51] Int. Cl.³ .............................................. B27B 9/04
[52] U.S. Cl. ...................................... 83/745; 83/574; 269/87.1; 269/273; 30/80
[58] Field of Search ................. 83/745, 574; 269/87.1, 269/273; 30/80

[56] References Cited

U.S. PATENT DOCUMENTS

| | | | |
|---|---|---|---|
| 2,638,134 | 5/1953 | Kearney | 269/87.1 X |
| 2,708,465 | 5/1955 | Huebner et al. | 83/745 |
| 2,773,523 | 12/1956 | Hopla | 83/745 |
| 2,823,709 | 2/1958 | Konieczka | 83/745 |
| 3,008,618 | 11/1961 | Watts et al. | 269/273 X |
| 3,085,343 | 4/1963 | Skripsky | 33/80 |
| 4,202,233 | 5/1980 | Larson | 83/574 X |

*Primary Examiner*—Donald R. Schran
*Attorney, Agent, or Firm*—Kokjer, Kircher, Bradley, Wharton, Bowman & Johnson

[57] ABSTRACT

A guide to be clamped on a door or similar object to guide a portable circular saw to insure accurate cuts. The guide has an elongated, rigid member having a block pivotally attached at one end. The object to be cut with the saw is clamped between that block and a second pivoting block slidably secured to the member. An eccentric device including a cam cooperates with a lost motion coupling for the second block to permit rapid initial installation of the guide followed by an increase in the clamping force to secure the guide in place. An elongated rib on the guide serves to stabilize the saw as the cut is made and the saw base slides along a planar portion of the guide member protecting the object from damage during the sawing operation.

5 Claims, 5 Drawing Figures

SAW GUIDE

This invention pertains to carpentry, and more particularly, to a guide for circular saws to insure more convenient and accurate cuts with such tools and to protect the surface of the cut member from scars and scratches as a result of the sawing operation.

Portable circular saws are commonly used by carpenters for a variety of sawing operations. Frequently such saws are utilized for cutting a door to proper size for accurately fitting the doorway framing structure or to clear impediments such as carpeting or the like which may interfere with the swing of the door through all or a portion of its range of movement. It is highly desirable that saw cuts of this type be made straight and accurate. Table saws often provide the requisite stability and guide structure for accurate cutting operations but such saws are not portable and therefor often do not provide the convenient accessibility needed for efficient carpentry operations of this type.

The carpenter frequently elects to make saw cuts, especially in trimming doors or the like to proper fit, with his portable circular saw. More often than not such cuts are made by unaided eye along a line drawn on the member by use of a straightedge or similar instrument. As a result, the cut may not be made as precisely as could have been accomplished with the use of a guide for the saw and the movement of the saw over the item may produce scratches or otherwise mar the surface. This is an especially pronounced problem in work on finished doors where the sawdust produced in the cutting operation tends to cover the surface over which the portable saw supporting member must slide.

In order to minimize the problem of inaccurate trim cuts of this general type, the carpenter sometimes nails or otherwise temporarily secures a piece of lumber or similar straightedge directly to the door to serve as a guide for the saw while the cut is made. This has the obvious drawbacks of slowing the operation while the straightedge is secured to the door and of creating nail holes or the like in the door which must be carefully filled and finished to restore the door to its original appearance. The expedient usually offers no protection to the surface of the door resulting from the movement of the saw support member across the sawdust on the finished surface.

Accordingly, it is a primary object of the present invention to provide a tool which may be used as an adjunct to a portable saw to overcome the foregoing disadvantages.

To this end, it is an object of the invention to provide a guide which may be quickly and easily attached to a door or similar item to accurately stabilize the movement of a portable circular saw therealong and yet which leaves the item undamaged when it is removed therefrom.

It is another object of the invention to provide such a saw guide which serves to protect the item to be cut from damage from the movement of the saw therealong.

A further object of the invention is to provide a tool of this type which can be easily and conveniently adjusted by a workman to accommodate a wide variety of items to be cut.

Still another object of this invention is to provide a saw guide which is capable of easy attachment to the item to be cut at substantially any angle as may be selected by the workman in order to effect the necessary cuts which are required in finish, trim cutting operations of this general type.

These and other important aims and objectives of the present invention will become apparent or will be more fully explained in the following description and explanation of the drawing, in which.

Figure 1:
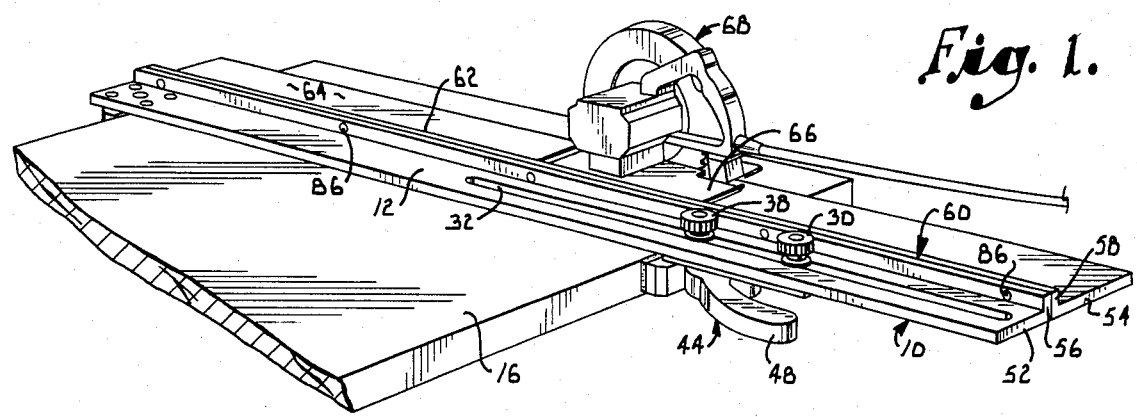
FIG. 1 is a fragmentary, perspective view on a reduced scale illustrating a guide embodying the principles of this invention installed on a door with a portable circular saw in position to be stabilized by the guide.

A saw guide embodying the principles of this invention is broadly designated by the reference numeral 10 and comprises an elongated, rigid frame in the nature of a generally planar element 12 having a substantially flat bottom surface 14 adapted to engage a surface of an item to be sawed such as a door 16 as illustrated in FIG. 1 of the drawing.

An elongated, rigid bar 18 is pivotally secured by a cap screw 20 proximal one end of frame element 12 onto the bottom surface 14 thereof so that bar 18 depends from element 12 with one edge surface 22 of the bar presenting an abutment adapted to be engaged against one edge of the item to be sawed. The opposite edge of the item is adapted to be engaged by an edge surface 24 of block means 26 mounted on frame element 12 in a manner to provide clamping force on the item to be sawed as will be hereinafter described.

Figure 2:
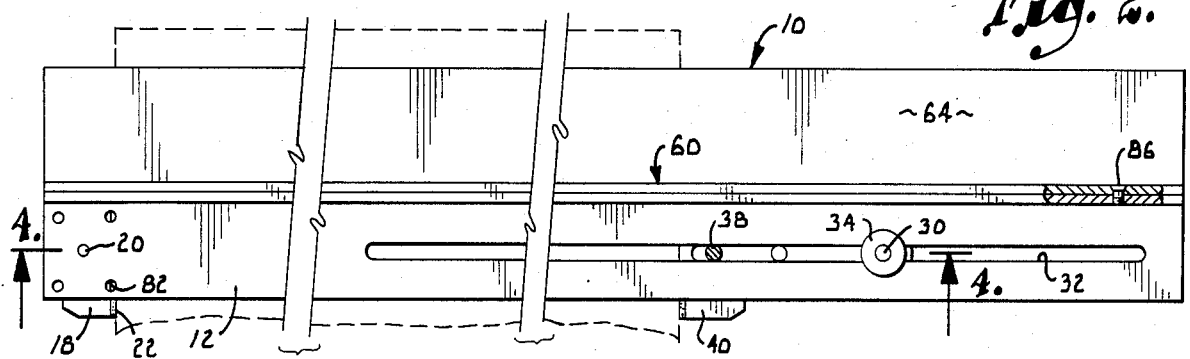
FIG. 2 is a fragmentary, top plan view of a saw guide of this invention, parts being broken away and shown in cross-section to reveal details of construction, a door with which the guide may be used appearing in phantom.
Figure 3:
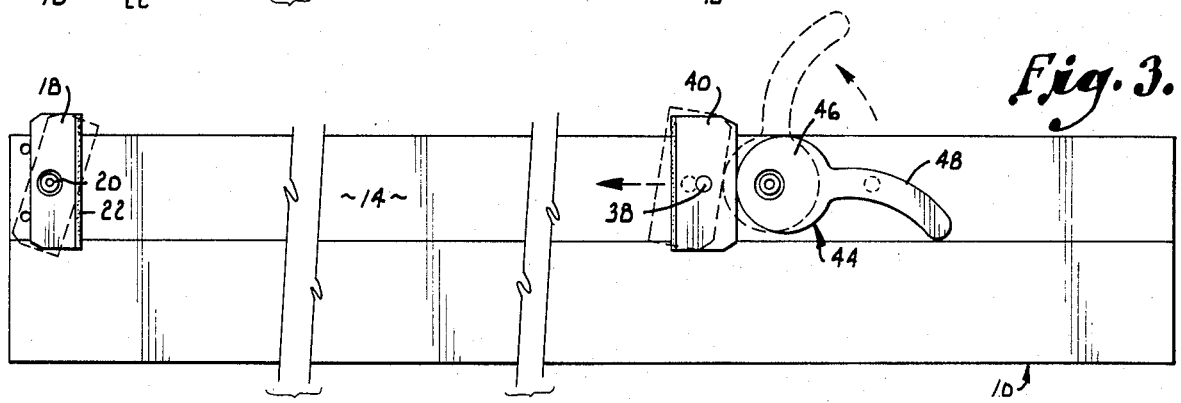
FIG. 3 is a fragmentary bottom plan view of the guide, alternate positions of some of the components being shown in phantom.
Figure 4:
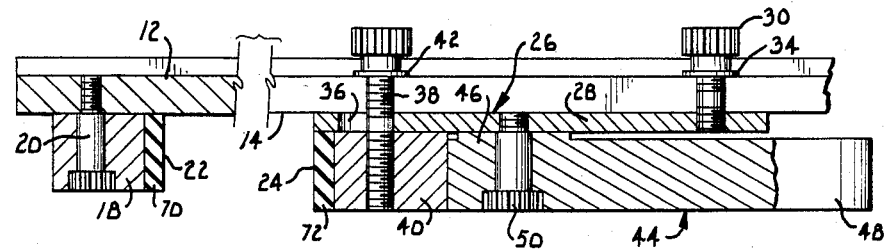
FIG. 4 is a fragmentary, detailed cross-sectional view taken along line 4—4 of FIG. 3.

Block means 26 includes a substantially flat mount or plate 28 shown best in FIG. 4 of the drawing. Plate 28 is releasably secured to the bottom surface 14 of element 12 by clamp means which may take the form of a thumb screw 30 threadably engaged with plate 28 and passing through a longitudinally extending slot 32 in element 12 as illustrated clearly in FIGS. 1 and 2 of the drawing. A radially extending flange 34 of cap screw 30 overlaps the proximal marginal edges of slot 32 so that tightening of screw 30 frictionally clamps plate 28 to element 12 as will be readily understood.

An elongated slot 36 (FIG. 4) in the end of plate 28 remote from screw 30 receives therethrough an elongated cap screw 38 threadably engaged with a generally rectangular, rigid block 40 disposed on the lower surface of plate 28 as illustrated in the drawing. Screw 38 projects through slot 32 in element 12 as well as through slot 36 in plate 28 and has a radially extending flange 42 which also engages the marginal edges defining slot 32 for releasably clamping block 40 at any predetermined position along slot 32 as will be hereinafter more fully explained. It should be pointed out at this junction, however, that slot 36 permits limited lost motion movement of block 40 toward and away from bar 18 when plate 28 is secured against longitudinal movement with respect to element 12.

Eccentric means broadly designated by the reference numeral 44, including a cam 46 and an integral, manually operable lever or handle 48, is pivotally coupled to the bottom surface of plate 28 by a cap screw 50 as shown best in FIG. 4 of the drawing. Cam 46 is positioned adjacent block 40 in a manner to permit movement of block mounting screw 38 to the rear of slot 36 in plate 28 when the cam is rotated to one position by handle 48. Cam 46 engages block 40 to move it toward bar 18 and to move cap screw 38 forwardly in slot 36 when the cam is rotated to another position.

In the presently preferred form of the invention, element 12 is constructed of two generally L-shaped components, each component having horizontally extending legs 52 and 54 respectively as shown best in FIG. 1. A vertically extending leg 56 is integral with leg 52 of one component and extends upwardly therefrom. A corresponding upwardly extending leg 58 is integral with leg 54 of the other component and the two upwardly extending legs 56 and 58 are secured together by a plurality of screws 86 to conjointly define an elongated rigid rib 60 extending the full length of element 12. Rib 60 has an edge 62 disposed adjacent a substantially flat, planar upper surface portion 64 of frame element 12 so that the supporting member 66 of a portable circular saw 68 can slide along surface portion 64 and be guided by the facing edge 62 of rib 60. It will, of course, be readily understood that edge 62 of rib 60 should be perfectly straight so that the proximal edge of the saw support member 62 will glide easily thereagainst and be guided to effect a perfectly straight cut on the item to be sawed.

Both components of element 12, and at least the component comprised of legs 54 and 58, are preferably constructed of a material such as a durable plastic or fiberglass reinforced plastic, which may be readily cut. Leg 54 of the component is initially sufficiently wide to be at least as wide as the width of the supporting plate of any saw likely to be used with the guide. Thus, if the user of the guide happens to have a saw equipped with a support plate narrower than the component leg, it is a simple matter for him to trim the leg so that it is precisely the same as the saw support plate. This is done by traversing the saw over surface 64 with the edge of the saw guided by the upwardly extending component leg 58.

It is, of course, desirable that the foregoing dimension of the guide be precisely the same as the width of the saw support plate. This insures that the edge of the guide coincides with the saw cut location and permits measurements to locate the cut on the object to be sawed to be made directly to the guide edge.

In operation, a workman hooks the remote end of the saw guide 10 over an edge of an item such as a door or the like to be sawed. He aligns the guide so that rib 60 extends in perfect parallelism to the cut which he desires to make with the portable saw. The workman slides plate 28 to dispose surface 24 of block 40 against the opposite edge of the item with cap screw 38 at the rear of slot 36 as illustrated in FIG. 4 of the drawing. With cap screw 30 loosened, the workman can easily slide block means 44 along slot 32 until surface 24 engages the proximal edge of the item.

At this point, the workman securely tightens cap screw 30 to lock plate 28 from any further sliding movement with respect to plate 12. Thereupon, the workman swings handle 48 of the eccentric means 44 to rotate cam 46 in a direction forcing block 40 tightly against the item to be cut. The lost motion effected by the longitudinal length of slot 36 permits movement of the block toward abutment 18 to increase the clamping force. Cap screw 38 is then tightened to fixedly secure the block in this position and to assist in clamping plate 28 against relative longitudinal movement with respect to element 12.

With the guide now clamped in position, the workman can readily move saw 68 along the guide to effect the desired cut. The saw is slidably supported on surface portion 64 of element 12 as the cut is made so that the item to be cut is not scratched or marred during the operation.

It will be readily appreciated that it is unnecessary that the guide be installed at right angles with the side edges of the item to be cut. On the contrary, the pivotal movement permitted by the mounting of bar 18 and of block 40 to frame element 12 readily permits angled disposition of the frame member, yet permits the clamping surfaces of the bar and block respectively to be tightly engaged against the edges of the item to be cut.

In order to enhance the stability of the guide, the clamping surfaces of bar 18 and block 40 may be provided with antislip means. In the drawings, rubber pads 70 and 72 are installed on such surfaces for this purpose. If desired, slight knurling or roughening of the surfaces could be utilized to produce this effect. Care should be taken, however, to insure that the surfaces are not roughened to an extent that the guide might mar or otherwise damage any item to be clamped therebetween.

It will be readily appreciated by those skilled in the art that the guide of this invention can be quickly and easily installed or removed from an item to be cut so that a portable circular saw is afforded a steady and accurate guide for any cut which is to be made with a saw. This item is particularly effective where the strip of material to be cut from a door or the like is relatively thin, making accurate cuts difficult if not impossible without a stabilizing saw guide.

Figure 5:
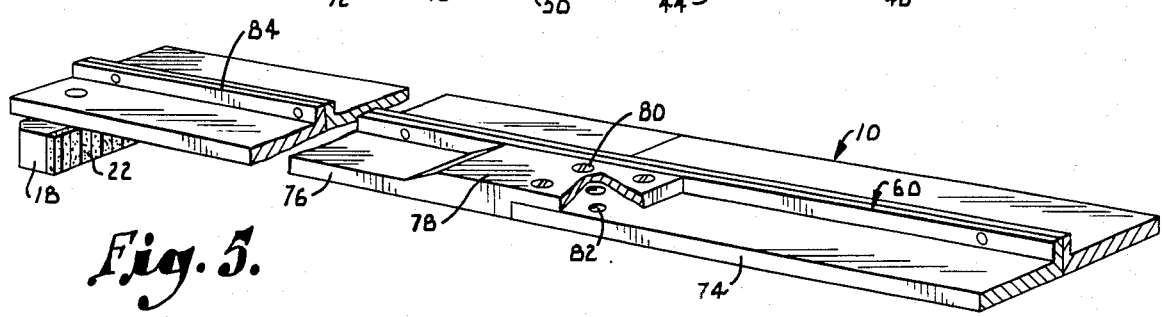
FIG. 5 is a fragmentary perspective view of the guide illustrating an optional extension affixed to the guide to equip the latter for attachment to relatively long items, parts being broken away to reveal details of construction.

The relatively long slot 32 provided in frame element 12 of the guide heretofore described permits the guide to be clamped on items varying substantially in width. Nevertheless, it is contemplated that the guide might be used with items having dimensions exceeding that which can be accommodated by the latitude afforded by slot 32. To this end, the guide support may be fabricated in a plurality of sections so that the respective sections may be releasably secured in end to end relationship to extend the effective length of the guide. A pair of sections 74 and 76 are illustrated in FIG. 5 of the drawing. It will be seen that section 76 has an overlapping portion 78 provided with screws 80 which fit with holes 82 (FIGS. 2 and 5) in section 74. Obviously, abutment 18 is removed from its initial position on section 74 and installed on the outermost end of section 76 when the latter is secured in longitudinal extension of section 74. It will be apparent to those skilled in the art that as many additional sections 76 as may be required could be added in end to end relationship with one another, if desired, to extend the length of the guide. Each additional section 76 has a longitudinally extending rib 84 aligned with and corresponding to rib 60 for guiding the saw throughout the entire length of its path of travel.

It is contemplated by this invention that any of a variety of acceptable means might be utilized for forming the frame element 12, including extrusion of the element as a single piece with rib 60 projecting upwardly therefrom. However, when the frame element is constructed of two L-shaped sections as illustrated in the drawing, such sections can be effectively secured together by the screws 86, spaced apart longitudinally along the sections and counter sunk to prevent the heads of the screw from interfering with the precision guidance of the saw by the rib. It will also be apparent that any of a wide variety of suitable materials may be utilized for the construction of the saw guide of this invention including aluminum or any of a number or relatively strong plastics.

Clamps in the form of the thumb screws 30 and 38 have proven to be convenient and entirely satisfactory in the use of the saw guide. Nevertheless, those skilled in the art will readily recognize that any of a number of different types of clamps could be substituted for the thumb screws without departing from the spirit of this invention.

I claim:

1. A guide for portable circular saws having a supporting member adapted for sliding along a surface, said guide comprising:

an elongated, rigid frame having a flat bottom surface, said frame being adapted to extend across an item to be sawed;

an abutment secured to the frame and depending therefrom, said abutment including a flat surface in position to be engaged against an edge of the item;

block means slidably mounted on the frame in longitudinally spaced apart relationship from said abutment flat surface and depending from the frame in disposition to engage against a second edge of the item to clamp the latter between the abutment and the block means;

said frame having an elongated, rigid rib intermediate the sides of the frame and extending longitudinally of the latter, said rib having a side edge adapted to receive said saw support member thereagainst to guide the saw as the saw is moved along said rib edge; and manually operable means secured to the frame and operably coupled with said block means to move the block means toward said abutment to selectively increase the clamping force on the item clamped therebetween;

said block means including a mount, means releasably securing the mount to the frame at any selected position longitudinally thereof, a block having a flat edge surface adapted to engage said item second edge, and means securing the block to the mount to permit limited lost motion between the block and the mount toward and away from the abutment; and said manually operable means including a cam rotatably secured to the mount and engagable with the block in position to engage the block and move the block flat surface toward the abutment to increase the clamping force on the item responsive to manual rotation of the cam.

2. The invention of claim 1, wherein said abutment includes an elongated, substantially rigid bar having an edge presenting said flat surface, and wherein the bar and block are each mounted for pivoting movement about respective axes normal to the frame bottom surface to permit the respective flat edge surfaces of the bar and block respectively to complementally engage corresponding edges of the item irrespective of the longitudinal alignment of the frame with respect to the item edges.

3. The invention of claim 2, wherein said edge surfaces of the bar and block respectively are provided with means to retard slipping when clamped against the corresponding edges of said item to be sawed.

4. The invention of claim 3, wherein said slip retarding means includes a rubber pad attached to each respective edge surface.

5. The invention of claim 1, wherein said frame includes at least a pair of elongated frame sections, and means for releasably interconnecting said sections in longitudinal extension of one another to permit selective altering of the length of the frame for accommodating items of different dimensions, the abutment means being pivotally mounted on the outermost end of the most remote one of said interconnected sections from said block means.

* * * * *